US006384414B1

(12) United States Patent
Fisher et al.

(10) Patent No.: US 6,384,414 B1
(45) Date of Patent: May 7, 2002

(54) METHOD AND APPARATUS FOR DETECTING THE PRESENCE OF AN OBJECT

(75) Inventors: David L. Fisher, Winter Springs, FL (US); Robert L. Rogers, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/200,314

(22) Filed: Nov. 25, 1998

Related U.S. Application Data (60) Provisional application No. 60/066,530, filed on Nov. 25, 1997.

(51) Int. Cl.[7] .................................................. G01J 5/10
(52) U.S. Cl. ............................ 250/339.14; 250/339.05; 250/339.15; 250/342; 250/DIG. 1; 340/567
(58) Field of Search ......................... 250/DIG. 1, 342, 250/339.14, 339.15, 339.05; 340/545.3, 565, 567

(56) References Cited

U.S. PATENT DOCUMENTS

| | | | |
|---|---|---|---|
| 4,310,852 A | | 1/1982 | Tricoles |
| 4,377,808 A | | 3/1983 | Kao |
| 4,465,940 A | | 8/1984 | Graff et al. ................. 250/578 |
| 4,546,344 A | | 10/1985 | Guscott et al. |
| 4,772,875 A | | 9/1988 | Maddox et al. |
| 4,785,292 A | * | 11/1988 | Kern et al. .................. 340/578 |
| 4,945,244 A | | 7/1990 | Castleman ............. 250/370.01 |
| RE33,824 E | * | 2/1992 | Johnson ...................... 340/522 |
| 5,130,543 A | | 7/1992 | Bradbeer .................... 250/342 |
| 5,231,404 A | * | 7/1993 | Gasiewski .................. 342/351 |
| 5,325,129 A | | 6/1994 | Henry et al. |
| 5,436,453 A | * | 7/1995 | Chang et al. ............. 250/338.1 |
| 5,473,311 A | | 12/1995 | Hoseit |
| 5,530,247 A | * | 6/1996 | McIver et al. ........... 250/336.1 |
| 5,586,048 A | | 12/1996 | Coveley |
| 5,693,943 A | | 12/1997 | Tchernihovski et al. ..... 250/342 |
| 5,877,688 A | * | 3/1999 | Morinaka et al. ........... 340/584 |
| 6,078,253 A | * | 6/2000 | Fowler ....................... 340/501 |

OTHER PUBLICATIONS

PCT Search Report dated Mar. 29, 1999.

"Intrusion detection on–the–move (IDM) phase II design analysis report," Prepared for: Defense Nuclear Agency, Nuclear Security Division, 6801 Telegraph Road, Alexandria, Virginia 22310, Contract No. DNA001–92–C–0192, Submitted by: VSE Corporation, 2550 Huntington Avenue Alexandria, VA 22303, Oct. 1994.

Rogers et al., "Development and tests of a low cost passive millimeter wave sensor," ARL The University of Texas at Austin Technical Report ARL–TR–97–3, Apr. 15, 1997, Copy No. 62, Final report under Contract N00039–91–C–0082, TD No. 04A1003, Passive Millimeter Wave Sensor, Prepared for: Defense Special Weapons Agency, Alexandria, VA 22310–3398, Monitored by: Naval Sea Systems Command, Department of the Navy, Wahsingotn, D.C. 20362–5101, Mar. 2, 1992 –Dec. 31, 1997.

\* cited by examiner

*Primary Examiner*—Constantine Hannaher
(74) *Attorney, Agent, or Firm*—Fulbright & Jaworski, LLP (57) ABSTRACT

A method and apparatus for detecting and classifying an object, including a human intruder. The apparatus includes one or more passive thermal radiation sensors that generate a plurality of signals responsive to thermal radiation. A calculation circuit compares the plurality of signals to a threshold condition and outputs an alarm signal when the threshold condition is met, indicating the presence of the object. The method includes detecting thermal radiation from an object at a first and second wavelength and generating a first and second responsive signal. The signals are compared to a threshold condition that indicates whether the object is an intruder.

44 Claims, 4 Drawing Sheets

METHOD AND APPARATUS FOR DETECTING THE PRESENCE OF AN OBJECT

BACKGROUND OF THE INVENTION

This application claims priority to provisional patent application Ser. No. 60/066,530 filed Nov. 25, 1997, entitled, "Apparatus and Method for Human Presence Detection and Object Classification" by David L. Fisher and Robert L. Rogers. The entire text of the above-referenced disclosure is specifically incorporated by reference herein without disclaimer.

FIELD OF THE INVENTION

The present invention relates generally to a method and apparatus for detecting the presence of an object. More specifically, the present invention relates to a method and apparatus to distinguish between human and non-human objects, from a movable platform.

DESCRIPTION OF RELATED ART

Typical intrusion detection systems often consist of one or more types of fixed volumetric detectors. For example, some systems utilize stationary microwave devices that emit microwave radiation at a known frequency and analyze returned radiation to determine changes in frequency induced by moving objects, which produce a Doppler-effect shift in the received radiation. Other systems use passive infrared (IR) detectors sensitive to IR radiation to determine when a heat source, such as a human body, moves into its field of view.

Some systems attempt to reduce the occurrence of false alarms by combining two or more sensors. For instance, a microwave sensor and an IR sensor have been deployed in a vehicle or robot to detect intruders. In such systems, a change in a condition sensed by the first sensor in a target area may cause the second sensor to become aligned with the first sensor. If both sensors indicate a change in respective conditions, an intrusion is indicated. Generally, these systems process each sensor signal separately, and they essentially AND the results together logically to generate an alarm signal.

Each individual sensor signal of such systems is subject to the same drawbacks as single-sensor systems. Single-sensor systems are prone to a relatively high incidence of false alarms because intruders may share similar characteristics with a non-intruder. Further, the use of a passive IR sensor from a moving platform presents at least one additional problem. It is difficult, if not impossible, to determine if a change in average temperature recorded by the IR sensor is due to an intruder or due to a change in the background temperature, because the IR sensor's field of view changes with its motion.

Traditional intrusion detection systems are not able to provide a simple and low-cost method of performing human detection from a moving platform. Rather, existing intrusion detection techniques often require computationally demanding image processing algorithms. Further, existing systems have not been able to utilize commercial passive infrared or active Doppler sensors to achieve such human detection.

A number of different techniques have been attempted for the detection of a person from a moving platform, but each has been unsuccessful. One method senses motion of the chest during respiration using a small Doppler radar system. However, the signal from such a system may be so small that other disturbances present in the background may overwhelm the signal in question, making its measurement practically impossible. Chemical sensors also have been considered for human presence detection, but their effective detection ranges are on the order of only a few feet. Acoustic sensors have also been considered, but background noise can easily overwhelm the desired signal or cause false alarms. Also, real-time video and infrared cameras with associated image processing have been considered for robotics applications, but the complexity, power consumption, and required computing power are incompatible with a small, battery-powered robot platform.

SUMMARY OF THE INVENTION

The present invention addresses shortcomings of the prior art, at least in part, by utilizing differences in the electromagnetic radiation emission and absorption properties of objects, including humans, at two or more separated frequencies to differentiate humans from other objects or from other types of emitters. The present invention may utilize radiation properties of the objects and need not rely on target motion or other characteristics that may be changed easily. The present invention may classify objects that come into the view of one or more moving sensors by contrasting the electromagnetic radiation emission and absorption properties of those objects at different frequencies. For example, a combination of infrared and millimeter wave sensors may be used to identify a desired object, such as a human intruder, even if that object moving. Further, the present invention may be used to identify hot spots within a particular area, such as a forest fire.

The present invention may utilize radiometric sensor data that is analyzed in order to identify characteristics differentiating humans from false targets. The characteristics used to classify an object entering the field may be determined by the properties of the objects themselves. There are several different characteristics that may be used to differentiate a human from some other object. In the present invention, such parameters, some of which may vary depending upon physical characteristics of the object and other possible false targets, may be examined and utilized for determining the presence of an object.

In one aspect, the invention is an apparatus for detecting the presence of an object that includes one or more passive thermal radiation sensors and a calculation circuit. The one or more passive thermal radiation sensors are adapted to detect thermal radiation at two or more differing wavelengths such that emissive and absorption properties of the object are distinguishably different at at least two of the two or more differing wavelengths. The one or more passive thermal radiation sensors generate a plurality of signals responsive to the thermal radiation. The calculation circuit is in operative relationship with the one or more passive thermal radiation sensors and is adapted to compare the plurality of signals to a threshold condition. The calculation circuit outputs an alarm signal when the threshold condition is met, indicating the presence of the object.

In other aspects, the differing wavelengths may differ by about three orders of magnitude. A first wavelength may range from about 1 microns to about 100 microns and another wavelength may range from about 0.1 mm. to about 200 mm. The apparatus may further include a moving platform coupled to the one or more passive thermal radiation sensors. At least two of the one or more passive thermal radiation sensors may include substantially the same field of view. The calculation circuit may include a one-dimensional numerical processing circuit. The object may include a human or a fire. The apparatus may also include a circuit adapted to filter radiometric background signals. The threshold condition may be a predetermined or an adaptively determined threshold condition. The threshold condition may include a ratio of radiometric temperatures of the object. That ratio may be about one. The threshold condition may include a difference in radiometric temperatures of the object. That difference may be greater than about zero. The threshold condition may include an apparent surface area of the object. The apparatus may also include a reflector adapted to direct artificial background radiation towards at least one of the one or more passive thermal radiation sensors.

In another aspect, the invention comprises an apparatus for detecting the presence of an object including an infrared sensor, a millimeter wave sensor, and a calculation circuit. The infrared sensor detects thermal radiation and generates a responsive first signal. The millimeter wave sensor detects thermal radiation and generates a responsive second signal. The calculation circuit is coupled to the infrared sensor and to the millimeter wave sensor. The circuit is adapted to compare the first and second signals with a threshold condition and to output an alarm signal when the threshold condition is met, indicating the presence of the object.

In other aspects, the apparatus may also include a moving platform coupled to the infrared sensor and to the millimeter wave sensor. The apparatus may further include a circuit to filter radiometric background signals. The apparatus may further include a range finding apparatus to determine a range to the object. The apparatus may also include a circuit to determine an apparent surface area of the object. The object may be a human.

In another aspect, the invention comprises a method for determining if an object is an intruder. The method includes detecting thermal radiation from the object at a first wavelength and generating a first responsive signal. It also includes detecting thermal radiation from the object at a second wavelength and generating a second responsive signal. At the first and second wavelengths, the object exhibits distinguishably different emissive and absorption properties. The method also includes comparing the first and second responsive signals to a threshold condition that indicates the object is an intruder.

In other aspects, a passive infrared sensor may detect thermal radiation from the object at the first wavelength and a passive millimeter wave sensor may detect thermal radiation from the object at the second wavelength. The first wavelength may range from about 8 microns to about 14 microns, and the second wavelength may be range from about 0.1 mm. to about 200 mm. The method may also include calculating a first and second apparent radiometric temperature from the first and second responsive signals, respectively. The threshold condition may include a difference between or a ratio of the first and second apparent radiometric temperatures.

In another aspect, the invention comprises a method of monitoring radiometric activity to determine the presence of an object. The method includes receiving a first input signal from a first radiometric sensor adapted to detect a first wavelength, where the first input signal is characteristic of a radiation spectrum of the object at the first wavelength. The method also includes receiving a second input signal from a second radiometric sensor adapted to detect a second wavelength, where the second input signal is characteristic of a radiation spectrum of the object at the second wavelength. The radiation spectrum at the first wavelength is distinguishably different from the radiation spectrum at the second wavelength. The method also includes calculating a first apparent radiometric temperature corresponding to the first input signal and calculating a second apparent radiometric temperature corresponding to the second input signal. The method also includes comparing the first and second apparent radiometric temperatures with a radiometric threshold condition indicative of the presence of the object.

In other aspects, the method may also include determining a range to the object. It may also include determining an apparent surface area of the object. It may further include comparing the apparent surface area to an area threshold condition indicative of the object. The area threshold condition may include an area corresponding to a human. The first radiometric sensor may have a field of view substantially similar to a field of view of the second radiometric sensor. The radiometric threshold condition may include a ratio of said first and second apparent radiometric temperatures, and that ratio may be about 1. The radiometric threshold condition may include a difference between said first and second apparent radiometric temperatures, and that difference may be greater than about zero. The method may also include outputting an alarm signal if the radiometric threshold condition is met. The first sensor may be a passive millimeter wave sensor, and the second sensor may be a passive infrared sensor. The method may also include directing an artificial background radiation towards the first or second radiometric sensors. It may further include distinguishing portions of the first and second input signals corresponding to background from portions of the first and second input signals corresponding to the object. It may also include subtracting the background from the first and second input signals. The steps of receiving the first and second input signals may occur when the first and second radiometric sensors are in motion. The object may be a human.

The present invention, therefore, in one aspect, includes an intrusion detection apparatus, including a plurality of passive thermal radiation sensors adapted to transmit a plurality of sensor signals. At least two of the sensors may be adapted to detect different, and possibly substantially different wavelengths, such that emissive and absorption properties of an intruder differ. A calculation circuit may be employed for receiving, processing, and comparing the processed plurality of sensor signals to a threshold level of an intruder, and for outputting an alarm signal indicating presence of the intruder when the processed plurality of sensor signals exceeds the threshold level, which may be predetermined or adaptively determined.

The present invention may also reside in a target detection apparatus for detecting human presence and object classification including: a first passive radiometric sensor for detecting thermal radiation and generating a first sensor signal and a second passive radiometric sensor for detecting thermal radiation and generating a second sensor signal. The second passive radiometric sensor may be adapted to detect a substantially different wavelength than the first passive radiometric sensor. The apparatus may include a calculation circuit for processing and comparing the processed first and second sensor signals to selected threshold levels for various intruders. In addition, a distance sensor for determining the distance to an object, a thermal radiation sensor, an internally stored map, and a calculation circuit for processing and comparing the radiation signal with the map to predetermined or adaptively determined threshold levels to reduce false alarm rates of intruder detection may be included. Additionally, thermal background radiation may be used to increase range and reduce false alarms (especially in fixed sensor arrangements).

DESCRIPTION OF ILLUSTRATIVE EMBODIMENTS

Figure 1:
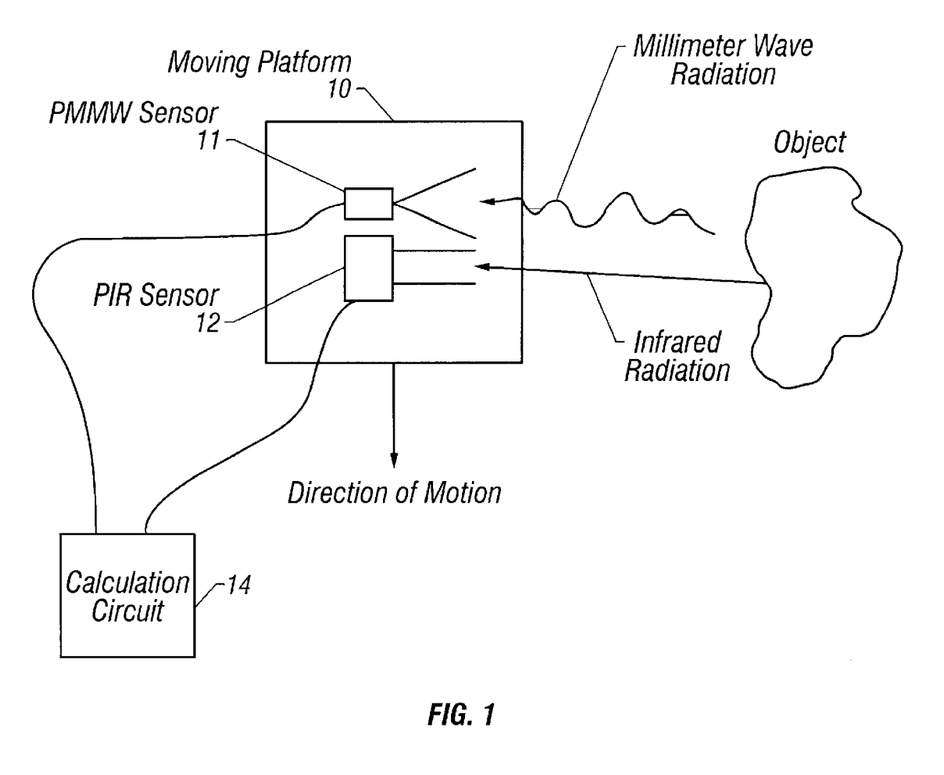
FIG. 1 is a block diagram of an exemplary embodiment according to the present invention.

FIG. 1 shows an exemplary embodiment of the present invention, in which a first sensor 11 and a second sensor 12 are configured on a moving platform 10 to detect the presence of a human in a side-looking configuration. Platform 10 may move and/or rotate in any direction. In particular, platform 10 and/or sensors 11 and 12 may move so as to achieve a 360 degree view. As illustrated, the sensors 11 and 12 are coupled to a calculation circuit 14. As used herein, a "circuit" may refer to any device that may process signals and/or data. In particular, a circuit may refer to a device that receives, processes, and/or compares signals or data. Thus, a circuit may refer to a one dimensional processor, a computer, a microprocessor, software adapted to run on a computer or any other suitable device. In one embodiment, calculation circuit 14 includes a microprocessor and the commercially available software LabView produced by National Instruments (Austin, Tex.). As used herein, a "calculation circuit" may refer to any device that may process and/or compare signals and may perform one or more calculations upon the signals or data. In the illustrated embodiment, calculation circuit 14 may include a personal computer. In an exemplary embodiment, calculation circuit 14 may include a computer running the software LabView produced by National Instruments (Austin, Tex.).

In one embodiment, calculation circuit 14 may be adapted to receive one or more signals from sensors 11 and/or 12. Calculation circuit 14 may process the one or more signals, and in particular, it may compare the signals to a threshold condition and output an alarm signal 24 when the condition is met, indicating the presence of an object. As used herein, a condition may be "met" when a signal value, a data value, or any combination thereof satisfies the condition. In particular, a condition may be met when, for instance, a signal, data, or combination thereof, equals, is greater than, or is less than a threshold value corresponding to a condition. Such a threshold condition or value may be predetermined or adaptively determined, and may be stored in a memory associated with, for instance, calculation circuit 14.

As used herein, "adaptively" may refer to a condition or value, or any combination thereof, that may be changed or may change according to a new situation. For instance, an adaptive threshold may refer to a threshold that changes according to a changing responsive signal from one or more sensors. Additionally, an adaptive threshold may change according to any one of a number of other parameters such as, but not limited to, ambient temperature or wavelength.

In one embodiment, sensor 11 may be a millimeter wave (MMW) sensor and sensor 12 may be an infrared (IR) sensor. The sensors may be used for intruder detection and object classification. The sensors may be coupled to moving platform 10. The use of such sensors may allow for more accurate, lower cost and complexity, and lower power consumption than traditional devices. A combination of multiple thermal radiation sensors may be used at many different wavelengths such that the emissitivity properties of objects at those different wavelengths are measurably and distinguishably different. As used herein, "distinguishably different" refers, generally, to a difference that may be perceived or marked as separate or different. For instance, one may be able to separate distinguishably different items into kinds, classes, or categories. In particular, distinguishably different radiation characteristics may allow for separation of objects into kinds, classes, or categories, and more particularly, distinguishably different radiation properties such as distinguishably different emissitivity and absorption properties may allow for classification of an object according to the present disclosure.

In particular, the differences in emissitivity may allow for the classification and identification of objects of interest. In particular, the electromagnetic radiation emission and absorption properties of objects at different frequencies may be contrasted to allow for the identification and classification of one or more objects, and in particular, one or more human intruders. Additionally, the use of spectral absorption and emission lines may be used to perform or aid in the classification and identification of objects.

In one embodiment, an IR sensor may respond to wavelengths ranging from about 1 micron to about 100 microns. In another embodiment, an IR sensor may respond to wavelengths ranging from about 8 microns to about 14 microns. In one embodiment, a MMW sensor may respond to wavelengths ranging from about 0.1 mm to about 200 mm. In another embodiment, a MMW sensor may respond to wavelengths on the order of about one cm, and more particularly, about one cm. Thus, the wavelength of the millimeter wave radiation detected may be about three orders of magnitude longer than that of the IR sensor, but one having skill in the art will understand with the benefit of this disclosure that many different suitable wavelengths and wavelength ranges may be utilized. Thermal emission from objects may vary considerably and distinguishably at different emission frequencies. As such, the use of different emission and absorption characteristics for various objects at widely different frequencies may allow for the easier identification of those objects.

In one embodiment, the radiometric sensors may be an IR sensor and an MMW sensor with a center frequency of, for example, 27.7 GHz. In an exemplary embodiment, each sensor may be a single beam sensor and the antenna patterns may be matched as closely as possible (i.e., substantially the same field of view) or compensated or corrected. In an exemplary embodiment for detection from a moving platform, the sensors may be operated in a side-looking mode to detect objects as the platform moves.

In an exemplary embodiment, an infrared sensor may be selected from commercially available sources such as from OMEGA Engineering, Inc., namely model OS-500. In one embodiment, an MMW sensor may be constructed from commercially available parts according to procedures known in the art. In one embodiment, a MMW sensor was constructed using a JS4-26004000-30-84 RF amplifier front end and a TV0440LW1 mixer, both made by Miteq. The local oscillator may comprise an oscillator and a doubling amplifier. The IF amplifier (bandwidth 10 MHz to 1.5 GHz) may be constructed out of commercially available parts, however, it may also be purchased as a complete unit. The IF amplifier may employ a thermal compensation circuit comprising a thermal sensor located near the IF MMIC amplifiers. A heater circuit may be controlled by a comparison circuit, which may engage the heater when the thermal sensor drops below a predetermined level. The circuit may be well insulated, allowing the MMIC amplifiers to come into thermal equilibrium. After rectification and amplification of an IF signal, a DC offset may be subtracted.

In one embodiment, analog signals responsive to and corresponding with detected thermal radiation from one or more sensors may be transmitted to a calculation circuit, where they may be digitized with an A to D converter and input, as data, into a microprocessor for processing. The microprocessor may convert voltage data into temperature data. The conversion of signal voltage into temperature may be implemented using a predetermined conversion factor in Kelvin per volt (K/V) according to procedures known in the art. In one embodiment, the microprocessor may subtract temperature data from a background average.

Computations may be performed on the data, the calculations producing a result which may be termed an output. Filtering computations may be performed on the data according to procedures known in the art. In one embodiment, filtering may include calculating the average value of 'n' most recently sampled data points. This type of filtering may be referred to as a moving average, or more particularly, a moving average filter. As used herein, "moving average" may refer to a variety of computations performed on a moving segment of data. For instance, a moving average may include computations performed on a segment of data that changes as new data is sampled and older data is dropped from a calculation.

In one embodiment, other filter calculations may be employed. For instance, filtering calculations including, but not limited to, weighted moving average filters, order statistic filters such as a median filter, or a combination of moving average and order statistic calculations or filters may be used to condition data, and more particularly, to condition temperature data. With the benefit of this disclosure, those of skill in the art will understand that such filters may be modified to compute various quantities from the data including, but not limited to, mean values, mean squared values, mean cubed values, median values, median squared values, first order derivatives, second order derivatives, higher order derivatives, and/or higher order moments. Further, it is contemplated that any combination of such quantities may be computed for the purpose of discriminating, distinguishing, or differentiating a target object from a background.

In one embodiment, a background average may be determined by filtering the past 'n' data points, where the number 'n' may be fixed or adaptive, depending upon external conditions and/or the environment. In one embodiment using a moving average of 'n' data points, a background temperature may be subtracted from the output of this filter and the difference may be compared with a threshold condition. When the filter output with the background temperature subtracted, which may be referred to as a shifted temperature, meets a threshold condition, which may be predetermined or adaptive, the object producing the change may be considered a target object. Using such a technique, the sensor temperature data need not be considered to be related to the background. Rather, it may be considered to be related to the object.

The averaging, or background calculations, may be suspended while the shifted temperature is above a threshold value. Therefore, the background average does not change while an object is in a sensor's view. Such filtering may be done for a plurality of sensors in use, and in one embodiment, the filtering may be done on one or both of a millimeter wave sensor and an infrared sensor. Any one or combination of sensors may be used as a trigger for initiating a calculation process for identifying a target object.

An object may be identified if some signal, data, comparison, or combination, ratio, difference, or any suitable combination thereof meets a threshold condition. In one embodiment, an object may be identified if shifted temperature data meets or is above a threshold. In such an embodiment, a comparison of background subtracted millimeter wave sensor data to background subtracted infrared data may be calculated for each temperature data point of the object. If a ratio or some other indicator, such as a difference in temperature values, meets a threshold condition for, for instance, a predetermined number of data points, the object may be classified. In particular, if the object is human, it may be classified as an intruder. As previously described, higher moments of the temperature (such as temperature squared, etc.) may be used in the above calculation, as well as any other mathematical manipulation of the temperature known in the art.

The illustrative embodiment of the present invention may very small and light with low power consumption. An exemplary embodiment may include complete passivity and no reliance on transmitted energy; utilization of simple sensors; limited amounts of required numerical processing; no requirement of exotic or extremely small signals; no complicated detection criteria; and a high degree of flexibility for widely varying environments.

By using sensors having substantially varying wavelengths, the present invention may better distinguish humans from other objects. Again, by utilizing wavelengths such that emissitivity and absorption properties of an object are distinguishably different at those wavelengths, one may contrast radiation properties to differentiate different objects, and in particular, a human may be differentiated from another object, such as a window, a lamp, or a warm box. For example, a window is one example of an object that may trigger an IR reading similar to that of a human. A window into a warmer exterior may look warm to an IR sensor. However, because of one or more distinguishable, measurable differences in the properties of the glass and the outside environment at MMW frequencies, the same window may look very cold to a passive sensor operating in the MMW region. It may be difficult, if not impossible, to differentiate between a person and a window using an IR sensor alone. Likewise, with only a MMW sensor data, it may not be possible to differentiate a cool wall or object from a window. However, FIGS. 2A–2C demonstrate that, in one embodiment, it may be easy to differentiate a person from a window using a combination of information from sensors operating at substantially different wavelengths, and in particular a MMW and IR sensor.

Figure 2A:
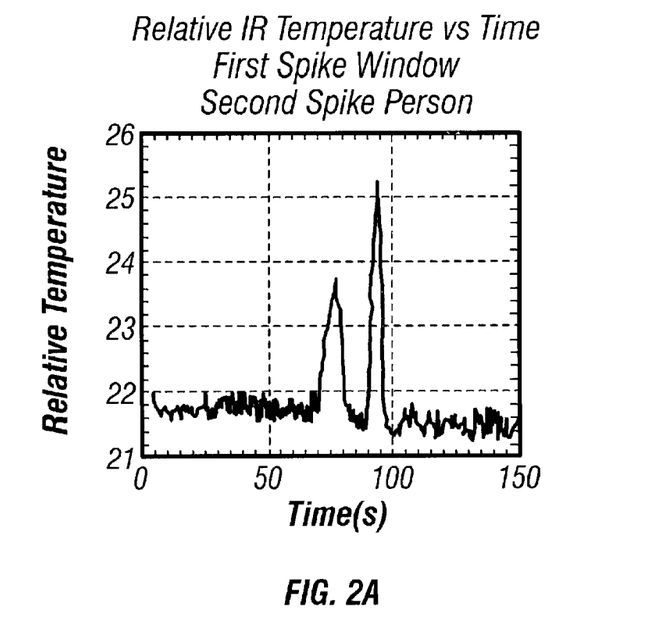
FIG. 2A is a graphical representation showing relative infrared temperatures of targets as measured by an embodiment of the present invention.
Figure 2B:
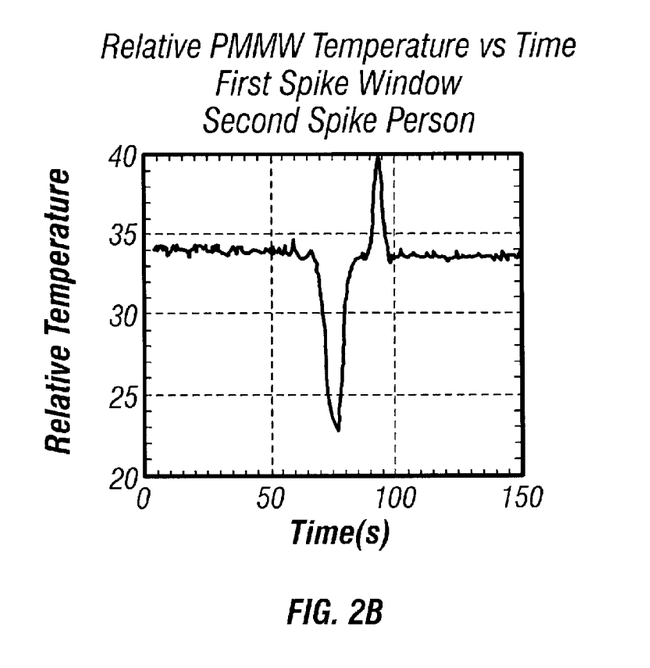
FIG. 2B is a graphical representation showing passive millimeter wave temperatures of targets as measured by an embodiment of the present invention.
Figure 2C:
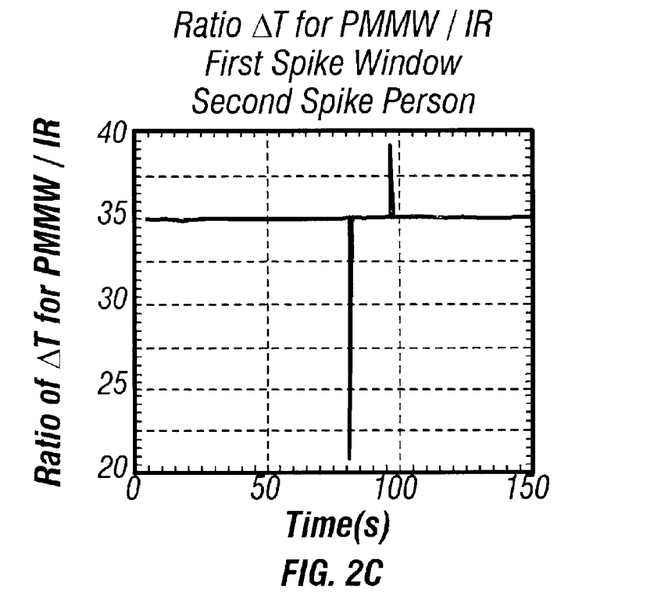
FIG. 2C is a graphical representation illustrating the ratio of passive millimeter wave temperatures in FIG. 2B to relative infrared temperatures in FIG. 2A.
Figure 3A:
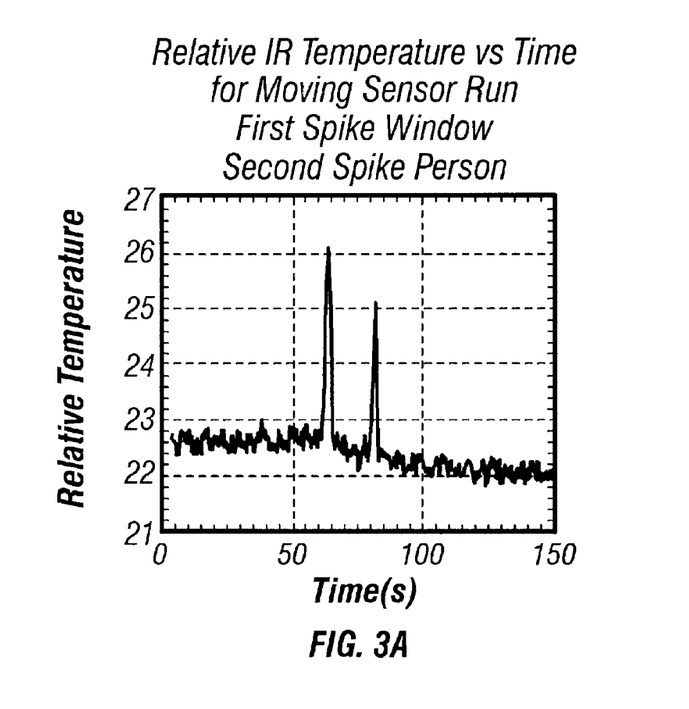
FIG. 3A is a graphical representation showing relative infrared temperatures of targets as measured by an embodiment of the present invention.
Figure 3B:
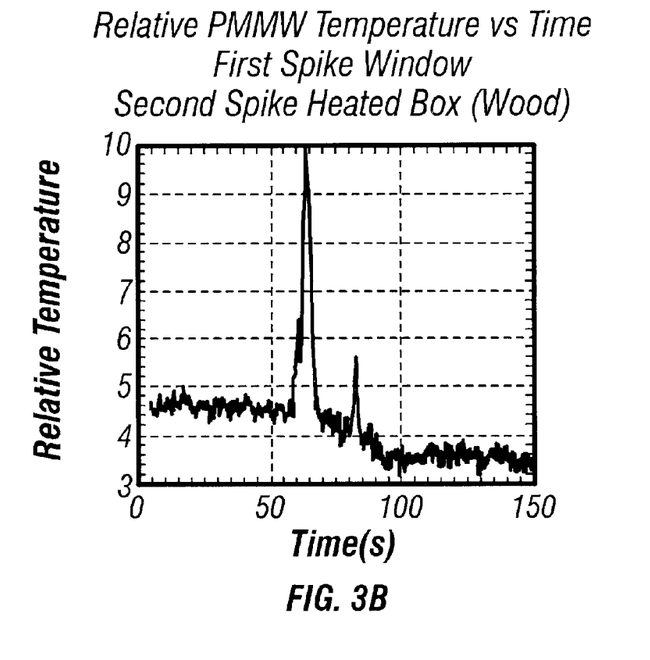
FIG. 3B is a graphical representation showing passive millimeter wave temperatures of targets as measured by an embodiment of the present invention.
Figure 3C:
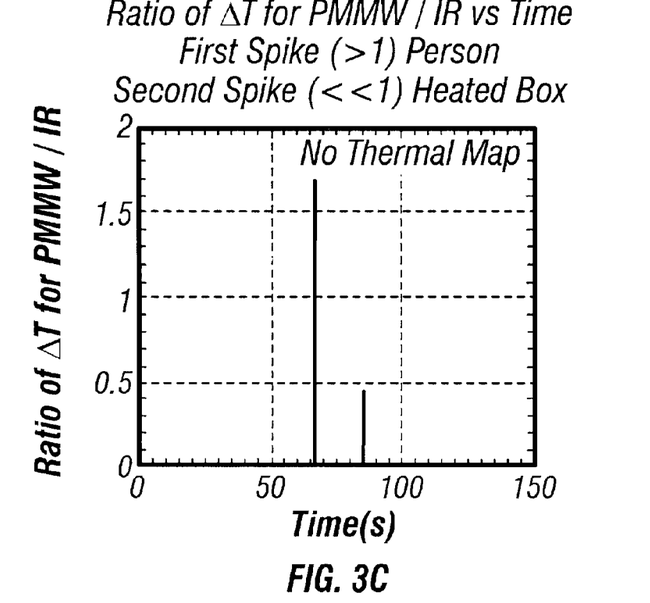
FIG. 3C is a graphical representation illustrating the ratio of the passive millimeter wave temperatures in FIG. 3B to the relative infrared temperatures in FIG. 3A.

In order to better understand FIGS. 2 and 3, it may be helpful to understand what sensors may detect. Any object about the temperature of absolute zero emits electromagnetic radiation whose intensity at any frequency depends on both the temperature and emissitivity of that object. Both IR and MMW radiometric sensors detect apparent radiometric temperature of an object viewed by the sensor. The change in radiometric temperature registered by the sensor is:

$$\Delta T = (T_o - T_b)\frac{A_o}{A_b} \quad (1)$$

where $T_o$ is the radiometric temperature of the object, $T_b$ is the radiometric background temperature, $A_o$ is the area of the object, and $A_b$ is the area of the footprint of the sensor beam. The radiometric temperature of the object is a function of the actual physical temperature of the object and the emissitivity of the object at the frequency in question. The underlying principle of this detection method is that at very different wavelengths, different substances have distinguishably and measurably different relative emissitivities and absorption properties. Because of this principle, the radiometric temperature of different objects are different when measured at different wavelengths. By comparison of the radiometric temperatures as measured at the different wavelengths, an exemplary embodiment may classify and identify objects, including human intruders.

If both sensors have the same field of view or a corrected or compensated view, $A_o$ and $A_b$ will be the same. Thus, once an object is detected, one may examine the ratio of the changes in temperature:

$$\frac{\Delta T_m}{\Delta T_i} = \frac{(T_{om} - T_{bm})}{(T_{oi} - T_{bi})} \quad (2)$$

where the symbols are the same as used previously, but the added 'm' subscript refers to the MMW radiometric temperature, and the 'i' subscript refers to the IR radiometric temperature in accordance with one embodiment.

With the benefit of the present disclosure, those of skill in the art will understand that the use of the ratio of equation (2) is only one of many possible implementations of the technique of the presently disclosed method and apparatus for using the difference in radiometric temperatures at different wavelengths to classify and identify objects. Additionally, with the benefit of this disclosure, those of skill in the art will understand that the ratio of equation (2) may change according to various parameters including, but not limited to ambient temperature and wavelength. As such, it is contemplated that many different ratio threshold conditions may apply, depending upon particular circumstances and conditions.

Another method contemplated by the present disclosure is to determine the difference in radiometric temperatures ($\Delta T_m$ and $\Delta T_i$) and classify the target as human or non-human depending on the sign and amplitude of that difference. A human may give a temperature difference greater than a threshold value, D, which may be about zero, as shown in equation (3):

$$(\Delta T_m - \Delta T_i > D) \quad (3)$$

whether the background temperature were greater than or less than the human temperature, assuming that the background temperature is approximately the same for both the IR sensor and the MMW sensor.

By comparison of the radiometric temperatures at different wavelengths, including IR and MMW wavelengths, an exemplary embodiment may distinguish between a number of different types of objects. In particular, one embodiment may especially identify objects having warm dense interiors and less dense exteriors. FIG. 2A illustrates an IR signature and FIG. 2B illustrates a MMW signature of a person and window in accordance with one embodiment. FIG. 2C shows the ratio of the relative radiometric temperatures of the infrared and MMW signatures. This ratio is shown here only to illustrate that the signature of a human is characteristic and is distinguishably different than other warm objects when both of the outputs of the two sensors are considered. For example, a human may give a ratio greater than a value, R, which may be about 1 when the background temperature is less than the human temperature. The ratio for a human may be less than about one when the background temperature is greater than the human temperature. For both a radiometric temperature ratio comparison and a radiometric temperature difference comparison, it may be assumed that realistic physical conditions are present, without any artificial sources. With the benefit of the present disclosure, those of skill in the art will understand that any number of threshold values or conditions, including but not limited to ratios and differences, may be established to successfully classify and identify objects, depending upon the parameters of the objects being measured.

In other embodiments, other methods of comparison may be used. For example, the difference in the change in radiometric temperatures may be used, as a human intruder may give a positive value for the difference between the change in MMW sensor and the sensor. Also, with the benefit of the present disclosure, one of skill in the art will understand that any combination of comparison methods may be used to identify objects and/or reduce false alarms.

Most non-metallic anhydrous materials are transparent to MMW radiation. Examples of these materials are clothes, wood, drywall, and plastic. A box made of wood or plastic heated on the surface by the sun or a heater vent, for example, may look cooler to a MMW sensor than to an IR sensor due to the transparency of the material and the fact that the inside is cooler than the heated surface.

A human, being a heat engine, has a hotter interior than its exterior clothing and may, therefore, appear as hotter on a MMW sensor than on an IR sensor due to the transparency of the clothes at the millimeter wavelength, assuming a consistent field of view for both sensors. The ratio of change in temperature on the MMW sensor to the change in temperature of the IR sensor may also increase if an intruder tries to hide from the IR sensor with extra clothing. It is, at least in part, this measurable contrast that allows one embodiment to differentiate and classify objects, particularly differentiation of an intruder from most other common surface-heated objects. Windows may be a different case because they may appear warm to an IR sensor, as would an intruder. However, as discussed earlier, a window may appear cold to the MMW sensor. This measurable and distinguishable contrast in the way two sensors view the window may allow for identification of the object according to the presently disclosed method and apparatus. The same may be true for a myriad of other objects including, but not limited to, an open door or a lamp.

FIGS. 3A–3C show IR and MMw sensor response for a person and a warmed wooden box in one embodiment. Note that the change in temperature ratio of MMW to IR is greater than one for the person and less than one for the heated box.

In one embodiment, if an intruder is classified as human, (based on, for example equation 1) the apparent surface area $A_0$ of the intruder may be determined by assuming that $T_0$ is the temperature of a human body, $T_b$ is the average background temperature, and $A_b$ is the area of the background at the distance of the suspected intruder. The area of the background may determined by a predetermined internal map once the distance to the suspected intruder is known (ie., by way of a distance determining device or sensor). This internal map may be similar to a calibrated lookup table and may be determined, for example, by experimentation through the process of measuring the area of coverage of a sensor at different distances from the sensor and this data becomes the map. The map may be generated by a circuit, and in one embodiment, by a mapping algorithm circuit. The map may be stored in memory, for instance in a memory associated with calculation circuit 14, and distance may be interpolated for determining $A_b$ at distances between the mapped distances. As may be determined by a predetermined or adaptive threshold, if a surface area $A_O$ is too small or large to be a specific object, for example, a human intruder, it may cause a threshold condition to be met and hence may be rejected, thereby providing a second threshold parameter to help reduce false alarms.

In one embodiment, this apparent surface area feature may be used alone (with only one passive thermal radiation sensor) to reduce false alarm rates in fixed and moving detectors. In particular, a single sensor may be used with a distance determining device or sensor 20, such as, but not limited to, a crossed infrared, ultrasound, or laser range finder for reducing or eliminating the occurrence of false alarms. From the distance information, the amount of surface area of the target may be determined (assuming a living mammal), and if the surface area is either too small or large to be human (determined experimentally), the target may be rejected. This may be useful to reduce nuisance alarms due to small animals, and may be used by itself for this purpose. In another embodiment, an apparent surface area A0 may be assumed to be that of a human, and the temperature T0 may be determined. If T0 is too high or low to be a human, the object may cause a false alarm threshold condition to be met and hence may be rejected as a false alarm.

In one embodiment, artificial thermal background may supplement and/or replace the natural thermal background. In particular, thermal background may be added to, augment, and/or replace natural background to increase detection range and reduce false alarms. This radiation background may be from natural sources or man-made sources. In such an embodiment, particularly an embodiment employing one or more fixed sensors, an artificial background may be used to enhance detection capabilities and reduce false alarms. In particular for perimeter coverage, a reflecting or partially reflecting mirror 22 in the millimeter wave region may be aligned to reflect the sky temperature when used outside into a sensor, for instance into a MMW sensor, to increase the contrast between the intruder and the background. Such a mirror 22 may be partially reflecting to make it more difficult for an intruder to evade, even if such an intruder attempts to evade detection by, for instance, using a reflective material to cover himself. In one embodiment, a detector may be triggered on a cold temperature spike in addition to a hot spike of appropriate amplitude. In one embodiment, a temperature sensor on the partially reflecting reflector 22 may be used to correct for temperature changes on that reflector.

With the benefit of the present disclosure, those of skill in the art will understand that the presently disclosed method and apparatus may be useful for many different applications. For instance, an embodiment, particularly an embodiment using a combination MMW and IR sensor, may aid in the detection and prevention of fires by finding interior hot spots. This application may be particularly useful for detection of heated interiors in large stored ingots of plastic, where there may be a long interval between the hot spot formation and a new fire, due to the insulating ability of plastic. These interior hot spots may be due to manufacture or past fires.

A combination IR and MMW sensor according to the present disclosure may also be highly effective for determining the seat of a fire. Firefighters often encounter restricted visibility in many situations where it is difficult to determine from where a fire is emanating. A MMW sensor may penetrate smoke quite well and may detect the heat of solid objects. An IR sensor may detect the heated gases. The combination may thus be used to identify the source of the flame and the heated gases.

Another application according to the present disclosure may be in sensing perimeter intrusion as described above. The discriminating ability of a combination of, for example, MMW and IR sensors may be used as a person detector in a dark room, or as a sensor to determine when a person enters a room (area activity monitor is another application, determining when people are in and out of an area).

Combination sensors according to the present disclosure may also be used to find animals, especially in the dark, and may be used to determine when animals enter a building such as a barn or chicken coop, in order to count or determine the presence of animals.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as illustrative embodiments only. Various changes may be made in the shape, size, and arrangement of parts. For example, equivalent elements or materials or methods may be substituted for those illustrated and described herein, and certain features of the invention may be utilized independently of the use of other features, all as would be apparent to one skilled in the art after having benefit of this disclosure.

What is claimed is:

1. An apparatus for detecting the presence of an object, comprising:

one or more passive thermal radiation sensors adapted to detect thermal radiation at two or more differing wavelengths such that emissitivity and absorption properties of the object are distinguishably different at at least two of said two or more differing wavelengths, said one or more passive thermal radiation sensors generating a plurality of signals responsive to said thermal radiation; and a calculation circuit in operative relationship with said one or more passive thermal radiation sensors and adapted to contrast the emissitivity and absorption properties of the object to detect its presence by (a) calculating apparent radiometric temperatures corresponding to said plurality of signals, (b) performing one or more calculations on said radiometric temperatures to produce an output, (c) comparing said output to a threshold condition, and (d) outputting an alarm signal when said threshold condition is met, indicating presence of the object.

2. The apparatus of claim 1, wherein said differing wavelengths differ by about three orders of magnitude.

3. The apparatus of claim 2, wherein one of said differing wavelengths ranges from about 1 micron to about 100 microns and another of said differing wavelengths ranges from about 0.1 mm to about 200 mm.

4. The apparatus of claim 1, further comprising a moving platform coupled to said one or more passive thermal radiation sensors.

5. The apparatus of claim 1, wherein at least two of said one or more passive thermal radiation sensors comprise substantially the same field of view.

6. The apparatus of claim 1, wherein said calculation circuit comprises a one-dimensional numerical processing circuit.

7. The apparatus of claim 1, wherein the object comprises a human.

8. The apparatus of claim 1, wherein the object comprises a fire.

9. The apparatus of claim 1, further comprising a circuit adapted to filter radiometric background signals.

10. The apparatus of claim 1, wherein said threshold condition is a predetermined or an adaptively determined threshold condition.

11. The apparatus of claim 1, wherein said threshold condition comprises a ratio of radiometric temperatures of the object.

12. The apparatus of claim 11, wherein said ratio is about 1.

13. The apparatus of claim 1, wherein said threshold condition comprises a difference in radiometric temperatures of the object.

14. The apparatus of claim 13, wherein said difference is greater than about zero.

15. The apparatus of claim 1, wherein said threshold condition comprises an apparent surface area of the object.

16. The apparatus of claim 1, further comprising a reflector adapted to direct artificial background radiation towards at least one of said one or more passive thermal radiation sensors.

17. An apparatus for detecting the presence of an object, comprising:
    an infrared sensor for detecting thermal radiation and for generating a responsive first signal;
    a millimeter wave sensor for detecting thermal radiation and for generating a responsive second signal; and
    a calculation circuit coupled to said infrared sensor and to said millimeter wave sensor, said circuit adapted to contrast the emissitivity and absorption properties of the object to detect its presence by (a) calculating apparent radiometric temperatures corresponding to said first and second signals, (b) performing one or more calculations on said radiometric temperatures to produce an output, (c) comparing said output with a threshold condition, and (d) outputting an alarm signal when said threshold condition is met, indicating presence of the object.

18. The apparatus of claim 17, further comprising a moving platform coupled to said infrared sensor and to said millimeter wave sensor.

19. The apparatus of claim 17, further comprising a circuit to filter radiometric background signals.

20. The apparatus of claim 17, further comprising a range finding apparatus to determine a range to the object.

21. The apparatus of claim 17, further comprising a circuit to determine an apparent surface area of the object.

22. The apparatus of claim 17, wherein the object comprises a human.

23. A method for determining if an object is an intruder, comprising:
    detecting thermal radiation from the object at a first wavelength and generating a first responsive signal;
    detecting thermal radiation from the object at a second wavelength and generating a second responsive signal, wherein at said first and second wavelengths said object exhibits distinguishably different emissitivity and absorption properties; and
    contrasting the emissitivity and absorption properties of the object by (a) calculating apparent radiometric temperatures corresponding to the first and second responsive signals, (b) performing one or more calculations on said radiometric temperatures to produce an output, and (c) comparing said output to a threshold condition that indicates if the object is an intruder.

24. The method of claim 23, wherein a passive infrared sensor detects thermal radiation from the object at said first wavelength and a passive millimeter wave sensor detects thermal radiation from the object at said second wavelength.

25. The method of claim 23, wherein said first wavelength ranges from about 8 microns to about 14 microns and said second wavelength ranges from about 0.1 mm to about 200 mm.

26. The method of claim 23, further comprising calculating a first and second apparent radiometric temperature from said first and second responsive signals, respectively.

27. The method of claim 26, wherein said threshold condition comprises a difference between said first and second apparent radiometric temperatures or a ratio of said first and second apparent radiometric temperatures.

28. A method of monitoring radiometric activity to determine the presence of an object, comprising the steps of:
    receiving a first input signal from a first radiometric sensor adapted to detect a first wavelength, said first input signal characteristic of a radiation spectrum of said object at said first wavelength;
    receiving a second input signal from a second radiometric sensor adapted to detect a second wavelength, said second input signal characteristic of a radiation spectrum of the object at said second wavelength, wherein said radiation spectrum at said first wavelength is distinguishably different from said radiation spectrum at said second wavelength; and contrasting the radiation spectra by:
    (a) calculating a first apparent radiometric temperature corresponding to said first input signal;
    (b) calculating a second apparent radiometric temperature corresponding to said second input signal;
    (c) performing one or more calculations on said radiometric temperatures to produce an output; and
    (d) comparing said output with a radiometric threshold condition indicative of presence of the object.

29. The method of claim 28, further comprising determining a range to the object.

30. The method of claim 29, further comprising determining an apparent surface area of the object.

31. The method of claim 30, further comprising comparing said apparent surface area to an area threshold condition indicative of the object.

32. The method of claim 31, wherein said area threshold condition comprises an area corresponding to a human.

33. The method of claim 28, wherein said first radiometric sensor has a field of view substantially similar to a field of view of said second radiometric sensor.

34. The method of claim 28, wherein said radiometric threshold condition comprises a ratio of said first and second apparent radiometric temperatures.

35. The method of claim 34, wherein said ratio is about 1.

36. The method of claim 28, wherein said radiometric threshold condition comprises a difference between said first and second apparent radiometric temperatures.

37. The method of claim 36, wherein said difference is greater than about zero.

38. The method of claim 28, further comprising outputting an alarm signal if said radiometric threshold conditions met.

39. The method of claim 28, wherein said first sensor is a passive millimeter wave sensor and said second sensor is a passive infrared sensor.

40. The method of claim 28, further comprising directing an artificial background radiation towards said first or second radiometric sensors.

41. The method of claim 28, further comprising distinguishing portions of said first and second input signals corresponding to background from portions of said first and second input signals corresponding to the object.

42. The method of claim 41, further comprising the step of subtracting said background from said first and second input signals.

43. The method of claim 28, wherein the steps of receiving said first and second input signals occur when said firs and second radiometric sensors are in motion.

44. The method of claim 28, wherein the object comprises a human.

* * * * *

UNITED STATES PATENT AND TRADEMARK OFFICE
CERTIFICATE OF CORRECTION

PATENT NO. : 6,384,414 B1
DATED : May 28, 2002
INVENTOR(S) : Fisher et al.

It is certified that error appears in the above-identified patent and that said Letters Patent is hereby corrected as shown below:

<u>Column 15,</u>
Line 4, please delete "conditions" and insert -- condition is -- therefor.

<u>Column 16,</u>
Line 7, please delete "firs" and insert -- first -- therefor.

Signed and Sealed this

Twenty-ninth Day of October, 2002

Attest:

JAMES E. ROGAN
Attesting Officer   Director of the United States Patent and Trademark Office